Figure 1:
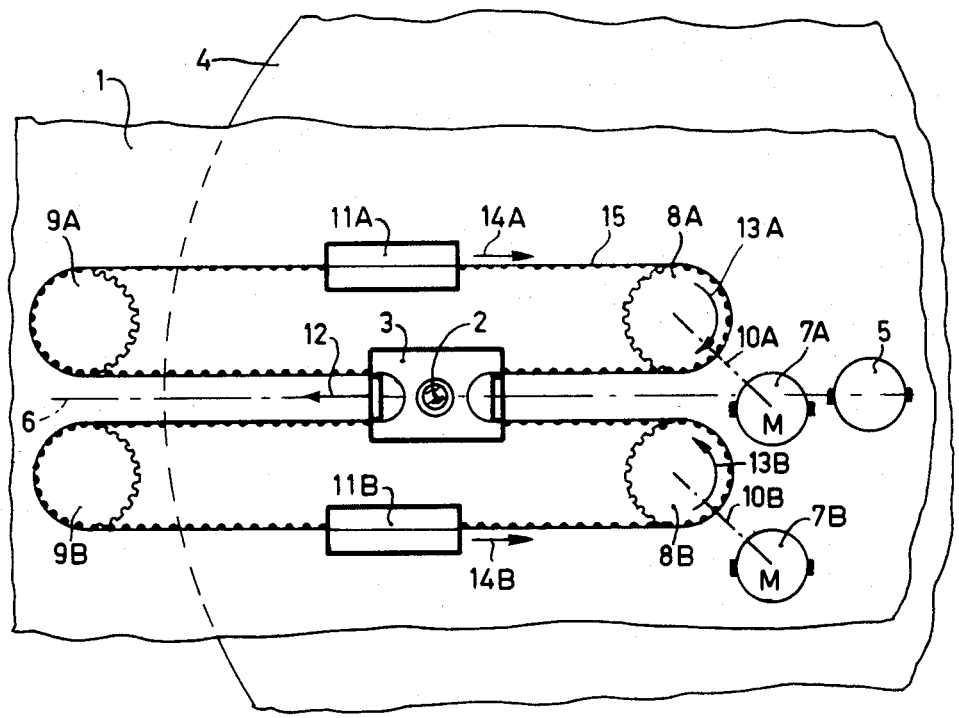

United States Patent [19]

Van Rosmalen

[11] Patent Number: 4,514,837
[45] Date of Patent: Apr. 30, 1985

[54] APPARATUS FOR OPTICALLY READING AND/OR RECORDING INFORMATION

[75] Inventor: Gerard E. Van Rosmalen, Eindhoven, Netherlands

[73] Assignee: U.S. Philips Corporation, New York, N.Y.

[21] Appl. No.: 455,342

[22] Filed: Jan. 3, 1983

[30] Foreign Application Priority Data

Oct. 19, 1982 [NL] Netherlands ............ 8204023

[51] Int. Cl.³ .............. G11B 21/08; G11B 7/00; G11B 5/56
[52] U.S. Cl. ............... 369/219; 369/215; 369/221; 369/254; 360/106
[58] Field of Search ........... 369/215, 219, 221, 244, 369/254; 360/106, 109

[56] References Cited

U.S. PATENT DOCUMENTS

| | | | |
|---|---|---|---|
| 3,749,827 | 7/1973 | Kinjo et al. | 360/106 |
| 3,922,720 | 11/1975 | Caletti et al. | 360/106 |
| 3,977,684 | 8/1976 | Camerik | 369/219 |
| 4,067,581 | 1/1978 | Stratton | 369/219 |
| 4,150,833 | 4/1979 | Yamamura | 369/219 |
| 4,399,477 | 8/1983 | Bryer | 360/106 |
| 4,423,447 | 12/1983 | Nishida et al. | 360/106 |
| 4,442,516 | 4/1984 | Funabashi | 369/219 |

Primary Examiner—Steven L. Stephan
Attorney, Agent, or Firm—Robert S. Smith

[57] ABSTRACT

An apparatus for optically reading and/or recording information on a rotary optical disc (4), such as a videodisc player or an optical recorder, comprises an objective carrier (3) for an objective (2) which is radially moved to and fro over a frame (1) by a drive unit. Driving is effected by means of two electric motors (7) which rotate in opposite directions and which move the objective carrier (3) to and fro and, simultaneously but in an opposite direction, move two balancing masses (11) in paths on each side of the path of movement of the objective carrier, so that during accelerations and decelerations of the to-and-fro movements of the objective carrier no reactive forces or reaction moments are transmitted to the frame.

3 Claims, 3 Drawing Figures

APPARATUS FOR OPTICALLY READING AND/OR RECORDING INFORMATION

The invention relates to an apparatus for optically reading and/or recording information on a rotary optical disc, which apparatus comprises: a frame; an objective; an objective carrier on which the objective is arranged and which is movable over the frame along a radial path relative to the disc; and a drive unit for driving the objective carrier along said radial path, which unit comprises an electric motor and transmission means between the electric motor and the objective carrier.

Such apparatus is known, for example from U.S. Pat. No. 4,152,728. This known apparatus is a video-disc player in which the objective, a gas laser and all optical and opto-electronic elements required in the optical path between the laser and the objective are together mounted on a radially movable carriage. Driving is effected by means of an electric motor arranged on the carriage. The transmission means comprise a plurality of gear wheels which co-operate with the electric motor and a gear rack which is rigidly mounted on the frame of the video-disc player. The drive unit of this known video-disc player is capable of moving the carriage in the radial direction with the required speed during reading of the video disc and is also capable of returning the carriage to its initial position or a selected position with a higher speed.

Video-disc players as well as optical-disc recorders require a drive unit which is capable of moving the objective carrier along its path with a high speed. In the case of video-disc players this requirement is prompted by the fact that new uses are envisaged for video-disc players. For example, during demonstrations or lectures it may be desirable to have the possibility of rapidly locating specific picture sequences, which may be effected under control of a computer. Furthermore, it becomes possible to design very sophisticated T.V. games using a special game computer or a so-called personal computer, if under control of the computer pictures recorded on a video disc can be displayed on a picture screen in the desired sequence and at the desired instant. In optical recorders the speed of access to the information recorded on the optical disc and also the speed with which the information can be recorded at a specific location of the disc are essential for the potential uses of such apparatus. For some uses the waiting times which occur should be minimal. The waiting time is determined by four factors, namely: the speed of rotation of the disc, the maximum acceleration of the objective carrier in its path of movement, the accuracy with which the objective carrier can be positioned, and the speed with which the desired track on the optical disc is located after a movement of the objective carrier.

From the above it follows that high accelerations and decelerations in the movements of the objective carrier are required in order to obtain a small waiting time, which means that the objective carrier must have a small mass, a robust construction and a sufficiently powerful drive unit. Moreover, a large waiting-time ratio is desired, which ratio is the average ratio between the time during which the objective carrier is accelerated or decelerated by the drive unit and the time during which the drive unit is required to be stationary for the purpose of cooling. The aforementioned known video-disc player comprises a drive unit which neither meets nor has been designed to meet these requirements.

The invention aims at providing an apparatus of the type mentioned in the opening paragraph by means of which high accelerations and decelerations, for example of the order of magnitude of 10 g, can be achieved with a small waiting-time ratio. To this end the invention is characterized in that the drive unit further comprises: two identical electric motors which rotate in opposite directions, two identical balancing masses which are each arranged on one side of the objective carrier and which move along paths parallel to the path of the objective carrier but in an opposite direction, and the two electric motors, the objective carrier and the balancing masses are coupled to each other by the transmission means for synchronizing said movements.

An apparatus in accordance with the invention may have a powerful drive unit, for example one comprising two d.c. commutator motors, by means of which high accelerations of the objective carrier can be achieved without the frame being subjected to the resulting forces or moments of force. A comparatively light and simple, preferred, embodiment of the invention is characterized in that the objective carrier and the balancing masses move along paths of equal length and each of the balancing masses has a mass equal to half the sum of the masses of the objective carrier, the objective and other parts which are connected to and move along with the objective carrier.

The following is an example of the forces which may occur. Said sum of the masses of the objective carrier, the objective and other parts which are connected to and move along with the objective support, hereinafter referred to as the total effective mass of the objective carrier, may be of the order of magnitude of 100 grammes in the case of a suitable light-weight version in which the objective carrier only carries the objective and the electro-dynamic means necessary for driving the objective. If the acceleration is 10 g, this means that a force of the order of magnitude of 100 Newtons is exerted on the objective carrier. Should this force act on the frame of the apparatus, this would result in the frame being subjected to a strong and undesired shock, which could even result in a displacement of the entire apparatus over the surface on which it is placed. Obviously, this last-mentioned effect depends on the weight of the apparatus and the coefficient of friction between the surface on which the apparatus is placed and the supporting feet of the apparatus.

A simple and reliable drive unit can be obtained if a further embodiment of the invention is used, which is characterized in that the transmission means comprise: first timing-belt pulleys on the spindles of the electric motors; two second timing-belt pulleys which are mounted for free rotation of the frame; and a single endless-loop timing belt; the first pulleys each being arranged on one side of one end of the path of movement of the objective carrier, the second pulleys each being arranged on one side of the other end, the timing belt engaging with said four timing-belt pulleys, and the centre portions of the belt sections between the first and the second pulleys respectively being connected to the one and the other side of the objective carrier.

Figure 2:
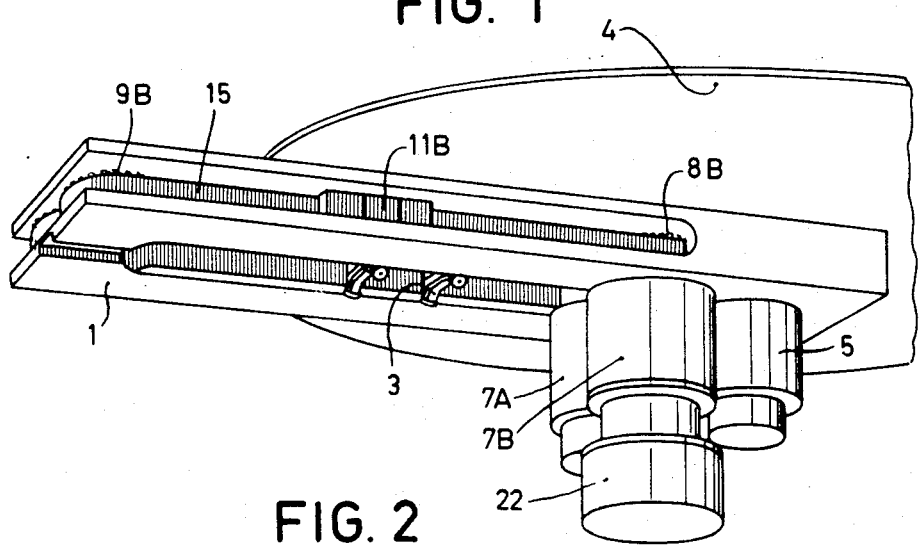
Figure 3:
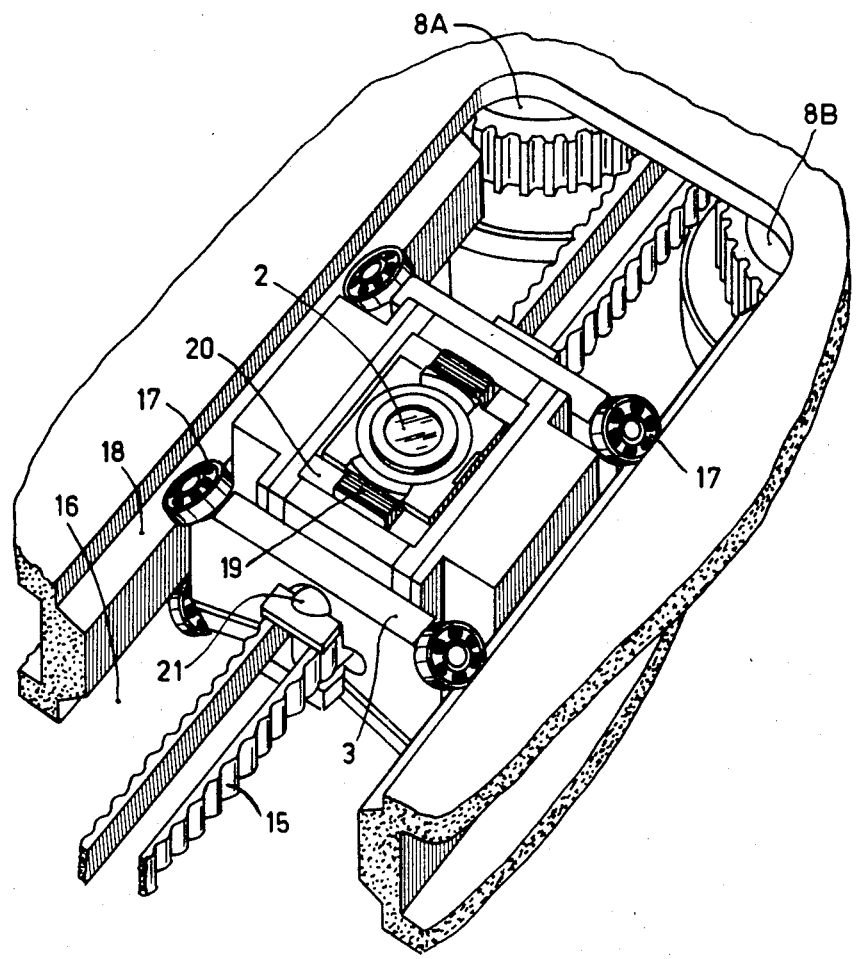

The invention will now be described in more detail, by way of example, with reference to the drawing, in which FIG. 1 is a schematic bottom view of a device in accordance with the invention, FIG. 2 is an angular perspective view, taken from below, of a drive means and a disc of an optical recorder, and FIG. 3 is a perspective view, taken from the top of the objective carrier of the optical recorder shown in FIG. 2.

The device shown in FIG. 1 comprises a frame 1 and an objective 2 arranged on an objective carrier 3. An optical disc 4 can be rotated by means of an electric motor 5 arranged on the frame. The objective carrier 3 can be moved over the frame 1 in a radial direction along a path 6. The drive unit for driving the objective carrier along the path 6 comprises two identical electric motors 7A and 7B which rotate in opposite directions. Further, the transmission means comprise first pulleys 8A and 8B and two second pulleys 9A and 9B. The pulleys 8A and 8B are arranged on the schematically shown spindles 10A and 10B of the motors 7A and 7B. The second pulleys 9A and 9B are mounted for free rotation of the frame 1.

Two identical balancing masses 11A and 11B, which belong to the drive unit and which are movable along paths parallel to the path 6 of the objective carrier but in the opposite direction, are arranged on each side of the objective carrier 3. If the objective carrier 3 moves, for example, in the direction indicated by the arrow 12 in that the pulleys 8A and 8B are driven in opposite directions of rotation 12A and 12B by the motors 7A and 7B, the balancing masses 11A and 11B move in the direction indicated by the arrows 14A and 14B. In order to achieve this the drive unit comprises an endless-loop timing belt 15. The two motors 7A and 7B, the objective carrier 3 and the two balancing masses 14A and 14B are thus coupled to each other by the transmission means 8A-B, 9A-B and 15A-B for synchronizing said movements.

In the embodiment shown in FIG. 1 the objective carrier 3 and the balancing masses 14A and 14B move along paths of equal length. Furthermore, the balancing masses 11A and 11B each have a mass equal to half the effective mass of the objective carrier 3. Thus, the simple drive unit shown provides full compensation for all mass forces, so that no resulting mass forces are exerted on the frame 1 during the movement of the objective carrier 2 along its path. Alternatively, the balancing masses may have a different mass, in which case they are moved along a path of different length. For example, if the mass of the balancing masses if larger the path may be shorter. However, this has the disadvantage that the mass of the complete drive unit becomes larger, which means a higher weight, whilst moreover the transmission means becomes more intricate. Alternatively, the balancing masses may be given a smaller mass and may be moved along a path of greater length. However, this has the disadvantage that the drive unit must have greater dimensions and becomes more intricate. The use of the two identical motors which rotate in opposite directions ensures that no resulting turning moment is exerted on the frame.

In FIGS. 2 and 3 the parts which are schematically represented in FIG. 1 are designated by the same reference numerals as in FIG. 1.

The entire frame 1 is made of aluminium and is formed with a slot 16 in which the objective carrier 3 is movable. This carrier is provided with a number of ball-bearings 17 which together with the oblique portions 18 of the wall of the slot 16 constitute a parallel guidance for the objective carrier 3. By means of coils 19 and permanent magnets 20 the objective 2 is movable over a small distance relative to the objective carrier 3. This enables a track on the optical disc 4 to be followed by the objective, electronic servo-circuits ensuring that the light beam is kept in focus on the information surface of the optical disc and the focussed light spot remains in track. The drawing does not show those parts of the optical path which are required in addition to the objective, because they are irrelevant to the present invention. They may be mounted rigidly on the frame 1 or on other stationary parts to be connected to the frame. For the fixation of the timimg belt to the objective carrier bolts 21 are provided on each side of the objective carrier. The balancing masses 11A-B comprise parts which are disposed on each side of the timing belt 15 and which are interconnected by clamping bolts. On its end the electric motor 7B carries a position encoder 22, which supplies a position signal, which signal is a measure of the nominal position of the objective carrier 3 relative to the frame 1, to the control circuitry required for controlling the movements of the objective carrier.

What is claimed is:

1. An apparatus for optically reading and/or recording information on a rotary optical disc, which apparatus comprises:
    a frame,
    an objective,
    an objective carrier on which the objective is arranged and which is movable over the frame along a radial path relative to the disc, and
    a drive unit for driving the objective carrier along said radial path, which unit comprises an electric motor and transmission means between the electric motor and the objective carrier, characterized in that the drive unit further comprises:
    two identical electric motors which rotate in opposite directions,
    two identical balancing masses which are each arranged on one side of the objective carrier and which move along paths parallel to the path of the objective carrier but in an opposite direction, and in that the two electric motors, the objective carrier and the balancing masses are coupled to each other by the transmission means for synchronizing said movements.

2. An apparatus as claimed in claim 1, characterized in that
    the objective carrier and the balancing masses move along paths of equal length, and
    each of the balancing masses has a mass equal to half the sum of the masses of the objective carrier (3), lhe objective and other parts which are connected to and move along with the objective carrier.

3. An apparatus as claimed in claim 2, characterized in that the transmission means comprise:
    first timing-belt pulleys on the spindles of the electric motors,
    two second timing-belt pulleys which are mounted for free rotation of the frame, and
    a single endless-loop timing belt (15),
    the first pulleys each being arranged on one side of one end of the path of movement of the objective carrier, the second pulleys each being arranged on one side of the other end, the timing belt (15) engaging with said four timing-belt pulleys, and the centre portions of the belt sections between the first and the second pulleys respectively being connected to the one and the other side of the objective carrier.

* * * * *